(12) United States Patent
Jagota et al.

(10) Patent No.: US 8,620,901 B2
(45) Date of Patent: *Dec. 31, 2013

(54) METHODS AND SYSTEMS FOR PROCESSING GRAPHS USING DISTRIBUTED MEMORY AND SET OPERATIONS

(75) Inventors: Arun Kumar Jagota, Sunnyvale, CA (US); Matthew Fuchs, Los Gatos, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/347,917

(22) Filed: Jan. 11, 2012

(65) Prior Publication Data

US 2012/0317149 A1 Dec. 13, 2012

Related U.S. Application Data

(60) Provisional application No. 61/495,041, filed on Jun. 9, 2011.

(51) Int. Cl.
*G06F 17/30* (2006.01)
(52) U.S. Cl.
USPC .......................................... 707/716; 707/798
(58) Field of Classification Search
USPC ......... 707/711, 713, 714, 715, 716, 769, 770, 707/771, 773, 774, 778, 780, 798, 802, 807, 707/810, 812, 829, 830, 600, 603

See application file for complete search history.

(56) References Cited

U.S. PATENT DOCUMENTS

| | | | | |
|---|---|---|---|---|
| 7,305,409 | B2* | 12/2007 | Lord et al. | 707/798 |
| 7,949,683 | B2* | 5/2011 | Goyal | 707/798 |
| 8,234,233 | B2* | 7/2012 | Zhou | 706/50 |
| 2007/0174304 | A1* | 7/2007 | Shrufi et al. | 707/100 |
| 2009/0144319 | A1* | 6/2009 | Panwar et al. | 707/102 |
| 2012/0072470 | A1* | 3/2012 | Joseph | 707/812 |
| 2012/0278261 | A1* | 11/2012 | Lin et al. | 706/12 |

* cited by examiner

*Primary Examiner* — Greta Robinson
(74) *Attorney, Agent, or Firm* — Dergosits & Noah LLP; Todd A. Noah

(57) ABSTRACT

Systems and methods for operating a database using distributed memory and set operations, and for evaluating graphs stored in the database. Any system may be represented as a graph structure having nodes and edges. The graph structure is stored in a distributed memory system using a key/value schema wherein each node is stored as a key and a set of neighbor nodes is stored as the corresponding value. A short path from one node to another may be determined by traversing the graph in stages, moving outward from each node in stages until common midpoint nodes are found indicating connections between the nodes. When the midpoint nodes are found, the paths connecting the nodes may be reconstructed

20 Claims, 8 Drawing Sheets

500

METHODS AND SYSTEMS FOR PROCESSING GRAPHS USING DISTRIBUTED MEMORY AND SET OPERATIONS

CLAIM OF PRIORITY

This application claims the benefit of U.S. Provisional Patent App. No. 61/495,041, entitled A System For Processing Graphs Using Memcached And Set Operations, by Matthew Fuchs and Arun K. Jagota, filed Jun. 9, 2011, the entire contents of which are incorporated herein by reference.

COPYRIGHT NOTICE

A portion of this disclosure document contains material which is subject to copyright protection. The copyright owner has no objection to the facsimile reproduction by anyone of the disclosure document, as it appears in the records of the U.S. Patent & Trademark Office, but otherwise reserves all rights.

TECHNICAL FIELD

One or more implementations relate generally to management and operation of a database using distributed memory and set operations.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which may be unique on their own.

Although relational databases have dominated the commercial landscape for structured information management in the past few decades, graph-oriented databases have recently begun to gain renewed favor and interest. In part, this is a result of a move away from the traditional needs of having to maintain and update hardware and software technology, and toward the acceptance of Software As A Service ("SAAS") providers and "cloud computing" vendors as alternative ways to implement computer-based systems and services. Also, there is a realization that some applications fit graph-oriented data models better than they do relational data models. These tend to be applications in which there is some relationship between data objects, and queries involving graph operations such as finding certain types of paths or connections between data objects are thus important for analyzing data in these applications.

Databases may be designed for storage of graphical structures to represent information. Graphs can be used to represent many different types of information including issues of practical interest and importance, and graphs often provide helpful visualization of how the data objects are connected and/or related. For example, in chemistry, molecules can be modeled with nodes representing atoms and edges representing the bonds between atoms. This allows tasks from simple construction to complex behavior analysis to be carried out using computer simulations. Vaccines and other new medicines and compositions can thus be modeled and studied effectively using graphical models.

In biology, an environment can be modeled using nodes to represent regions or habitats for certain species and edges to represent migratory patterns between the regions. Such a model might be used, for example, to track the spread of disease, or to study how the species' presence impacted natural vegetative growth, or to measure the impact that movement of one species has on the movement of another species, etc. In sociology, a social network can be modeled using nodes to represent individuals within the network and edges to represent the connections or relationships between the individuals.

As noted, a typical graph structure for a graph-oriented database represents the significant objects or entities of interest as a set of nodes, connected by edges, the edges describing the relationship or connection between nodes. Further, the nodes and edges may also have properties.

There are several graph-oriented database products available and/or presently in use. For example, Pregel is Google's graph engine, designed to mine relationships from graphs, but it is not capable of delivering real time search results as it is a batch process. Neo4J is an open-source NOSQL graph database, providing an object-oriented, flexible structure with transactional capability, but it is not horizontally scalable. HyperGraphDB is a general purpose distributed storage mechanism using a standard key/value store nomenclature to handle graph nodes and edges.

It remains an objective of database designers, architects and researchers to find improved methods of storing and accessing data for use in data operations.

BRIEF SUMMARY

Systems and methods are described for managing and operating a database using distributed memory and set operations, and in particular, for evaluating graphs stored in the database. Many types of systems and models are well represented as graphs, for example, where there are a large number of objects of interest, and the objects are connected by some defined relationship, feature, or some other basis. The graph is constructed by having nodes represent the objects and edges represent the relationships or connections between the objects.

In one embodiment, the graph of a network is stored in a distributed memory apparatus using a key/value schema, wherein each of the nodes in the network is stored as a key, and for each key, a corresponding value is stored. Advantageously, the stored value is one or more sets of neighbor nodes. A neighbor node is defined as one that is connected to the node of interest by an edge.

According to a described method for finding a viable short path from a first node to a second node, the graph of the network is traversed in stages, outward from the first node and outward from the second node, seeking common neighbors between them. At each stage, sets of neighbor nodes are compared; that is, the neighbor set for the first node is compared with the neighbor set for the second node. For example, in the first iteration, one set of neighbor nodes are located at a distance of d=1 from the first node and the other set of neighbor nodes are located at a distance of d=0 from the second node (i.e., the second node itself). In one embodiment, the comparison step is done by performing an intersection operation on the sets of neighbor nodes in distributed memory.

If the comparison finds common nodes, the common nodes represent midpoint nodes in multiple paths connecting the first node to the second node, and the paths are reconstructed and the results delivered to a user.

If the comparison operation does not find common nodes, then a next set of neighbor nodes is obtained for one of the nodes at a time, in alternating stages, and the comparing step is performed again with the next set of neighbor nodes replacing the prior set. The next set of neighbor nodes is located one edge further away from the node of interest than those in the prior set.

In order to obtain the next set of neighbor nodes, for each node in the prior set, the set of neighbor nodes located at a distance of d=1 from node, that is, the value stored with the node in distributed memory, is retrieved then combined using a union operation. This results in a new intermediate set. Difference operations are then used to subtract the prior neighbor sets from the intermediate set, thus yielding the next set.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings, like reference numbers are used to refer to like elements. Although the following figures depict various examples, the one or more implementations are not limited to the examples depicted in the figures.

DETAILED DESCRIPTION

1. Overview

Figure 1:
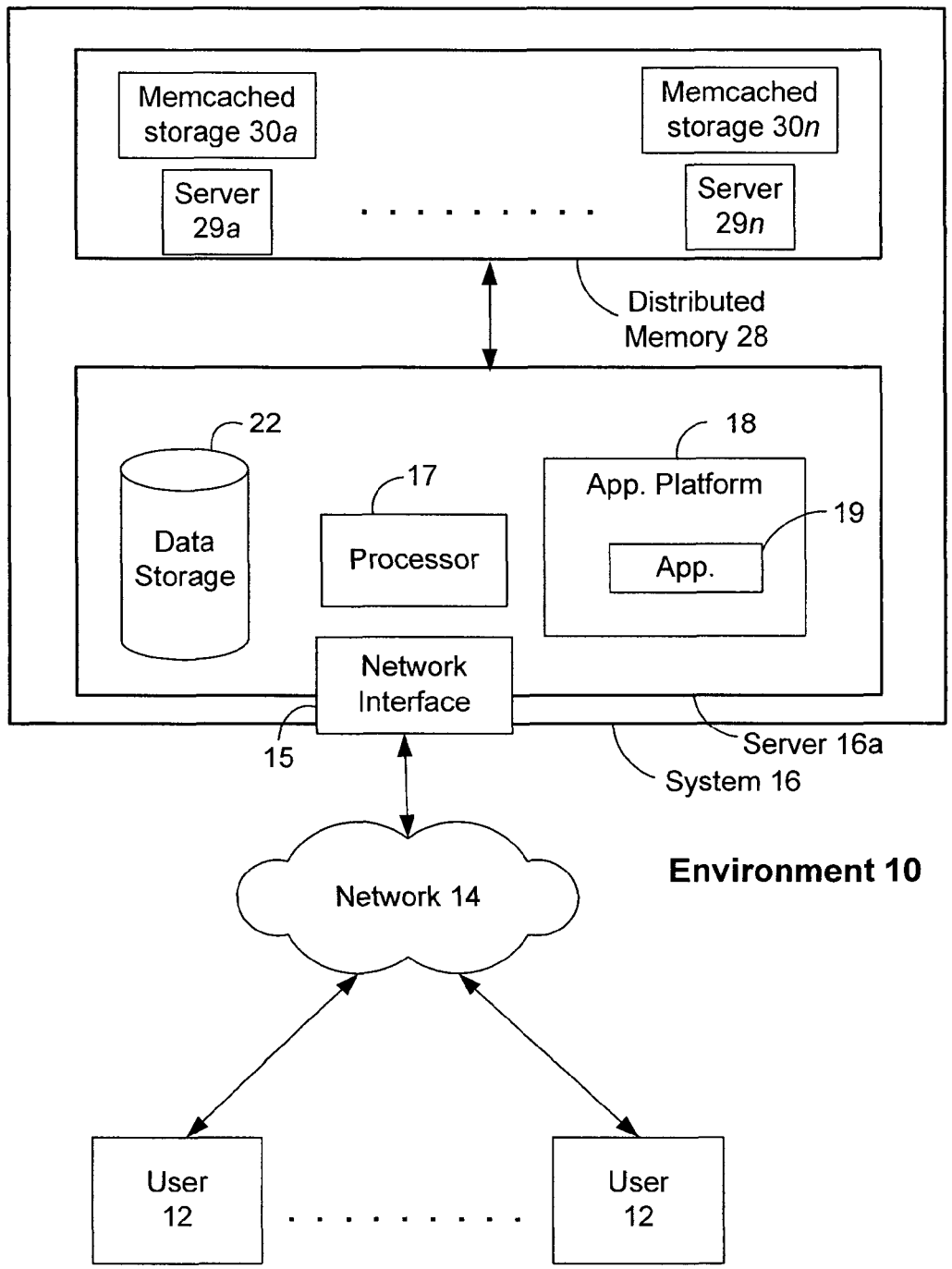
FIG. 1 is a simplified block diagram illustrating one embodiment of a multi-tenant database system ("MTS")

Systems and methods are described for representing a collection of data as a graph, for storing such graphs in a distributed memory system, and for operating on the graphs to infer relationships and other information from graph data.

A distributed memory system may be implemented using open-source memcached storage technology, which provides a horizontally scalable resource that allows for fast and efficient data processing, including concurrent processing, enabling greatly improved speeds for data access and query operations. Techniques for using a distributed memory system to store and operate on sets of data are described in co-pending U.S. patent application Ser. No. 13/104,193, entitled Methods and Systems for Latency-Free Database Queries, and in co-pending U.S. patent application Ser. No. 13/104,226, entitled Methods and Systems for Latency-Free Contacts Search, the disclosures of which are incorporated herein by reference. These techniques include basic set operations, such as union and/or intersection of sets, and represent the preferred methods for carrying out the set operations described herein.

Graph-oriented databases are generally known, wherein the database is organized to store graphical representations of data, for example, nodes (representing entities) connected by edges (representing relationships between entities). The representation of a social network as a graph is a natural application for a graph-oriented-database, since a social network can readily be modeled as a plurality of nodes representing the entities, usually individuals or business contacts, and a plurality of edges connecting the various nodes and representing the relationships between the connected entities.

Advantageously, the systems and methods described herein use the same general graphical model of nodes and edges, but store and use the graphs in a different manner, using a key/value schema with a distributed memory system. Each node of the graph is stored as a key, and for each key/node, a set of "neighbor nodes" is stored as the value corresponding to the key. The sets of neighbor nodes stored in the distributed memory system can be used in fast and efficient set operations in the manner described in the co-pending applications identified above, which are then incorporated into simple methods as described herein in order to evaluate a graph to draw inferences in support of any legitimate query over the database.

As used herein, a set of neighbor nodes $N_d$ is defined as those nodes that are located at a specific distance d from the node of interest. For example, the set of neighbor nodes at a distance of 1 from the node of interest is designated $N_1$, and consists of those nodes that are connected along a single edge to the node of interest, and therefore have a direct relationship with the node of interest. The set of neighbor nodes $N_2$ are located at a distance of 2 from the node of interest and do not have a direct relationship with the node of interest, but are connected only indirectly through another node. This indirect relationship also has a path length of 2, but may be useful to the node of interest, for example, in order to make a connection through the common node. Likewise, longer path lengths may yield indirect connections, but the value or utility of the connection generally diminishes with length or distance from the node of interest.

Initially, only the set of neighbor nodes having a direct relationship with the key/node of interest is stored in the key/value store. However, if there is available capacity and suitable demand, additional sets of neighbor nodes may also be routinely stored, i.e., sets of nodes at larger distances. It makes sense to do so in order to avoid duplicative operations, for example, involving popular nodes. Therefore, at a minimum, an implementation strategy may also store sets of neighbor nodes for popular nodes that are frequently used in query operations.

The nodes and/or edges can also have properties associated with them that may be used in weighting or filtering of the graphs, or possibly, the results provided to a user. The properties may also be used to provide strength to inferences drawn from evaluating the graph.

The methods described herein are useful for finding a short path between a first node (origin) and a second node (destination). This is done by traversing the graph in stages, and comparing sets of neighbor nodes for the origin and destination (using a set intersection operation) until one or more common nodes are found. The common nodes represent midpoints in multiple paths connecting the nodes of interest, and the full path(s) may be obtained by reconstructing each half of the path from the midpoint back to the origin in one direction and to the destination in the other direction.

In the first stage, neighbor nodes located at a distance of 1 from the origin are compared (intersected) with neighbor nodes located at a distance of 0 from the destination (that is, the destination node itself). If the intersection yields a null set (no common nodes), then the technique retrieves a new set of neighbors for the destination and performs an intersection again; then retrieves new origin neighbors—intersect again— then new destination neighbors—intersect again—etc., until a solution is found or the process simply ends as yielding a path too long.

When new neighbor sets are needed, they may be obtained by retrieving all the values stored with nodes of the prior neighbor set, and performing a union of all those nodes then subtracting duplicates.

2. Hardware/Software Environment

A database is a well known component of computer-based systems providing structured storage for electronic data records. Although the present disclosure is focused on graph-oriented databases, the physical requirements and demands for such a system do not differ greatly from that of a standard relational database—only the management and allocation of resources differ. The database is accessed by users through computer-implemented devices in a computing environment. The database is configured to allow storing, indexing, searching and retrieving of a large number of data records, as well as security and backup for the system. The database is typically hosted on a single server, and management of the database is handled by a software utility called something like DBMS, which runs on the database server and is programmed in accord with application needs. Although it is typical for multiple databases to be hosted on a single server, database resources are typically limited by physical server capacity, and additional server capacity may sometimes be required for operations involving large data sets.

Figure 5:
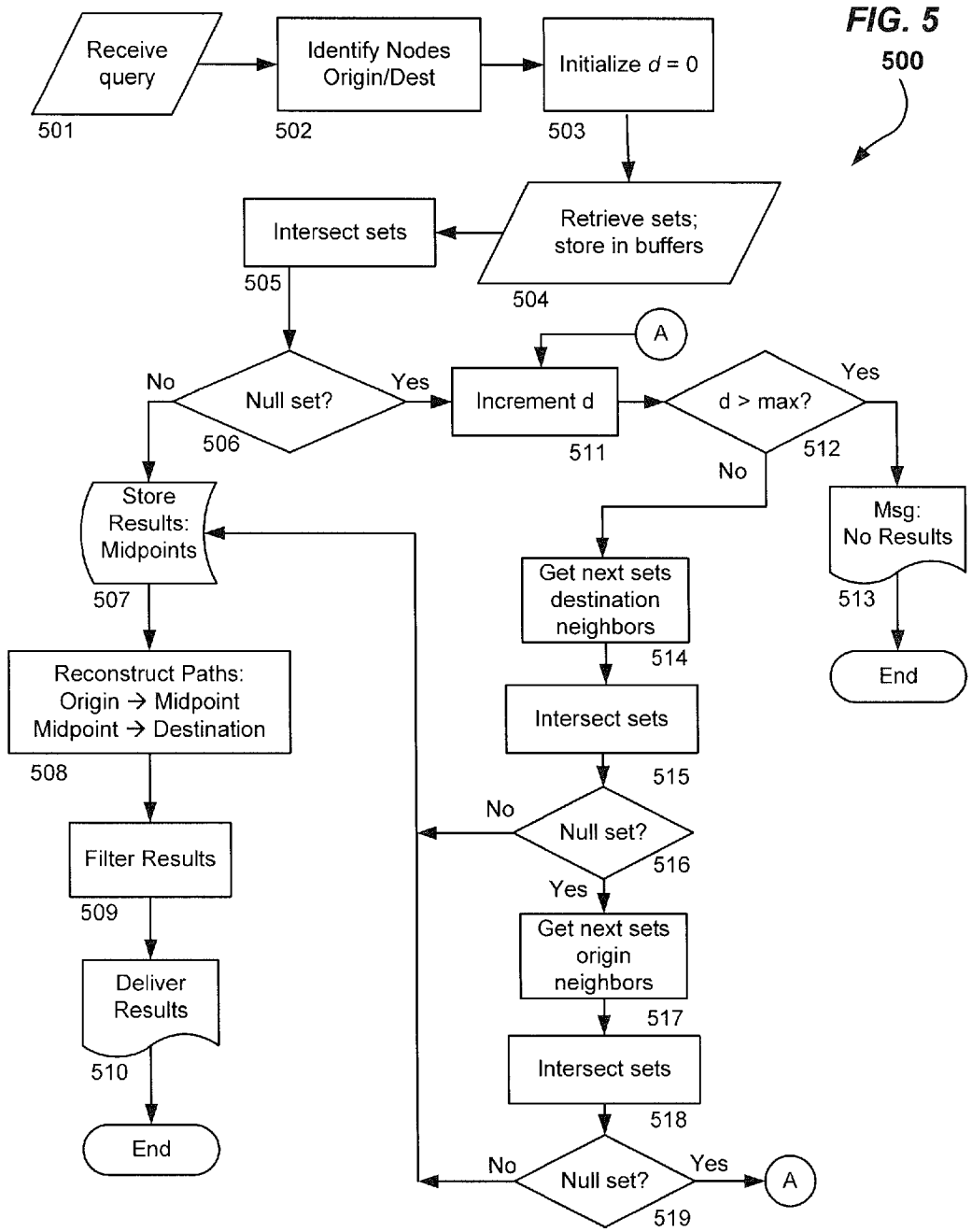
FIG. 5 is a flow diagram illustrating a process for finding a short path between nodes.
Figure 6:
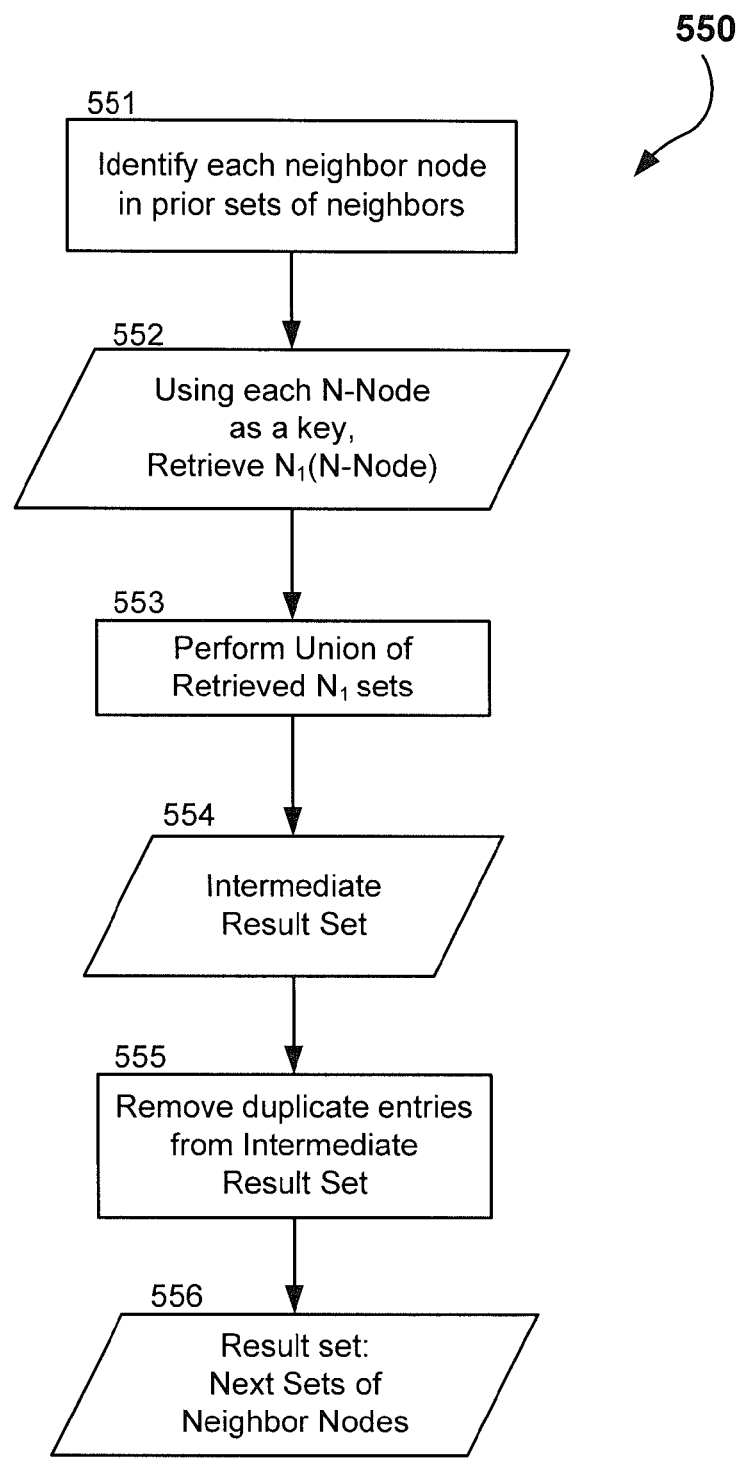
FIG. 6 is a flow diagram illustrating a process for obtaining new sets of neighbor nodes for use in the short path process.

In one embodiment, illustrated in FIG. 1, an on-demand, multi-tenant database system ("MTS") 16 is operating within a computing environment 10, wherein user devices or systems 12 access and communicate with MTS 16 through network 14 in a known manner. As used herein, the term multi-tenant database system refers to those systems in which various elements of hardware and software of the database system may be shared by one or more customers. For example, a given application server may simultaneously process requests for a large number of customers, and a given database table may store rows upon rows of data for an even larger number of customers. As used herein, the term query refers to a set of steps used to access information in a database system. More detailed MTS embodiments are shown in FIG. 5 and FIG. 6, described below.

User devices 12 may be any computing device, such as a desktop computer or a digital cellular telephone, and network 14 may be any type of computing network, such as the Internet, as described in more detail below.

The operation of MTS 16 is controlled by a computer-implemented processor system 17 resident on server 16a, and network interface 15 manages inbound and outbound communications with the network 14 from the MTS. One or more applications 19 are managed and operated by the MTS through application platform 18. For example, a database management application runs on application platform 18 and is programmed in well known manner to execute indexing, access and storage routines for the database. In addition, the methods described herein may be incorporated into the database management application.

MTS 16 provides the users of user systems 12 with managed access to many features and applications, including tenant data storage 22, which is configured through the MTS to maintain tenant data for multiple users/tenants. Tenant data storage 22 may be physically incorporated within MTS 16, or may alternatively be configured as remote storage, or alternatively, or in addition to, may be serviced by a distributed memory system 28.

The distributed memory system 28 is coupled to the MTS server 16a. The distributed memory 28 is comprised of a plurality of memcached storage $30a \ldots 30n$, and corresponding memcached storage servers $29a \ldots 29n$. The distributed memory 28 is used to store indexed graph structures in a key/value schema, and such storage may be permanent and/or temporary. Also, the distributed memory 28 may be used for performing database operations as directed by the database manager program.

3. Distributed Memory: Memcached Storage

Memcached storage is a general purpose distributed memory caching system that is available as an open source tool, and is horizontally scalable to arbitrary lengths. In short, a number of memcached server instances listen on user-defined ports to access spare memory on one or more machines. All the pieces of spare memory form a giant hash table that may be distributed across multiple machines. See Fitzpatrick, Distributed Caching with Memcached, 124 Linux Journal, August 2004 (http://www.linuxjournal.com/article/7451). The latest memcached storage software release v.1.4.6 is available on the Internet at http://memcached.org/.

Memcached storage provides an attractive alternative to traditional client/server architectures by providing a relatively arbitrary allocation of memory resources to applications, and managing those memory resources in a manner that is invisible to the client. The memory resources available to a memcached storage system may be spread across multiple servers.

Prior co-pending U.S. application Ser. Nos. 13/104,193 and 13/104,226 filed May 10, 2011, incorporated by reference, describe the use of a distributed memory apparatus to perform fast set operations, such as intersection and union. It is preferred that the same techniques be used on the data sets described herein to quickly and efficiently perform set operations, but in this disclosure we will only refer to the use of such operations generically, and the reader should refer to the co-pending applications for details of the specific data operations.

4. Representation and Storage of Graphs

A graph can be an effective way to specify, model and evaluate relationships among a collection of objects in virtually every field of study. As noted above, in a typical graph, the objects are represented as a set of nodes $n_0 \ldots n_n$, and the relationships between nodes are represented as a set of edges $\{n_i, n_j\}$ the edges connecting pairs of nodes that have some defined relationship, connection, or feature in common.

Figure 3A:
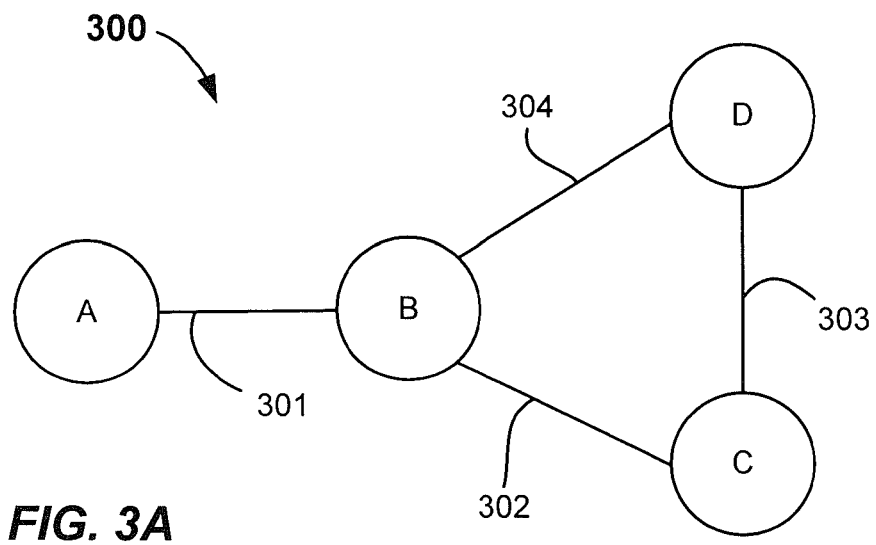
FIG. 3A is a block diagram illustrating a portion of an undirected graph structure.

FIG. 3A shows a simple graph 300 having four nodes labeled A through D connected by four edges: edge 301 connects nodes A and B; edge 302 connects nodes B and C; edge 303 connects nodes C and D; and edge 304 connects nodes D and B. As noted. the relationship represented by the edges may be any type of relationship, connection, feature or characteristic consistent within the graphical context. For example, the graph may model a social network, where the nodes represent individual people and the edges represent personal relationships between the connected people. If the graph models a communications network, then the nodes represent server hosts and the edges represent direct communication links between the hosts. If the graph is a street map of downtown in a large metropolitan area, then the nodes represent points of interest (specific locations) while the edges represent one-way and two-way streets connecting the points of interest.

The graph 300 of FIG. 3A is considered undirected in that the relationship between the connected nodes is symmetrical; that is, the connection attributed to the edges in the model goes either way, and one can easily traverse the graph from node to node without regard for any directionality in the relationships. Many social graphs would be considered undirected where the edges represent a symmetrical personal acquaintance between nodes.

Figure 3B:
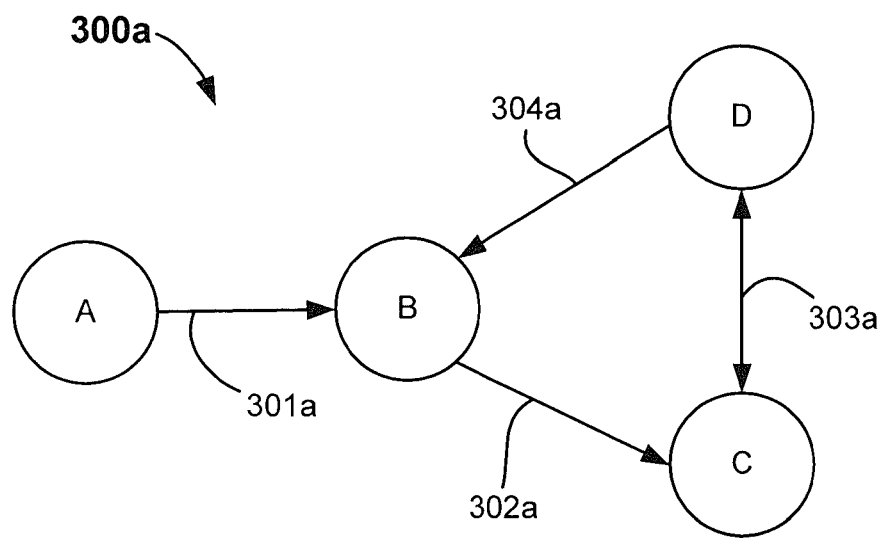
FIG. 3B is a block diagram illustrating a portion of an directed graph structure.

For some models, the graph or portions thereof may be considered directed. In these cases, the edges may have directional characteristics that indicate that the functional relationship between nodes only goes one way, and is not symmetrical. The small changes to the method required for the directed case are described below. For example, FIG. 3B shows another simple graph 300a with the same four nodes labeled A through D, connected by four edges, but in this graph, edge 301a connects nodes A and B and includes an arrow head pointing from A to B; edge 302a connects nodes B and C and includes an arrow head pointing from B to C; edge 303a connects nodes C and D and includes an arrow head pointing from C to D and another arrow head pointing from D to C; and edge 304a connects nodes D and B and includes an arrow head pointing from D to B. The arrow head shows the directionality of the relationship, and thus, path 301a leads from node A to node B, but not vice versa. Likewise, there is only a single directed path 302a from node B to node C and a single directed path 304a from node D to node B. The path 303a between nodes C and D is a two-way path and can be traversed in either direction. One simple example of a directed graph is the street map showing one-way and two-way streets. If the user of such a map, represented by FIG. 3B, wanted to go from point A to point D, then the path to take goes down street 301a to point B, then down street 302a to point C, then along street 303a to the destination point D. Note that street 303a is a two-way street, while streets 301a, 302a and 304a are all one-way streets on this portion of the map.

Figure 3C:
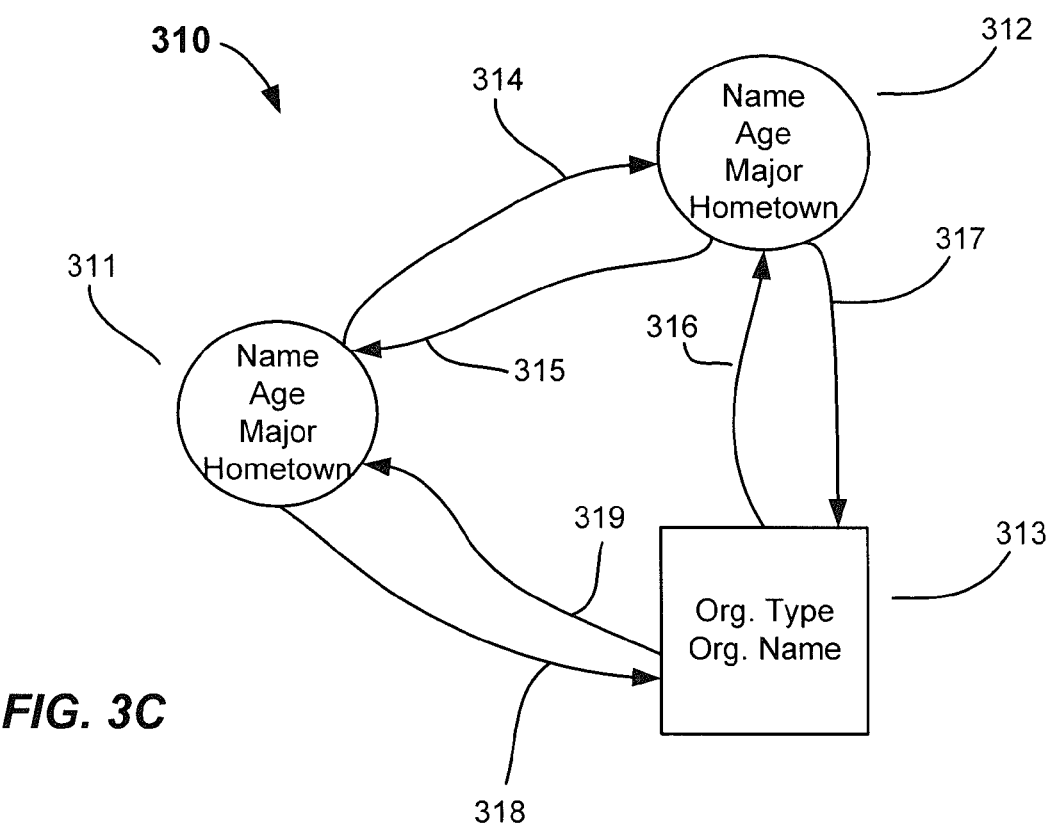
FIG. 3C is a block diagram illustrating a portion of an directed graph structure, wherein both the nodes and edges include additional data.

In other graph embodiments, the nodes, or the edges, or both, may have properties or features associated with them. FIG. 3C shows a simple but slightly more complex graph 310 than in FIGS. 3A and 3B, for example, the graph representing a collection of student and student organizations, wherein the nodes can represent either a student or a student organization, and an edge represents two different types of connections: student-to-student, and student-to-organization. In this graph, both the nodes and the edges have features or characteristics associated with them. Nodes 311 and 312 are basic nodes, representing individual people, and include additional data regarding the individual, such as name, age, major, and hometown. Edges 314 and 315 connect nodes 311 and 312, respectively, but each edge is directional in describing the relationship from the point of view of the respective node. For example, student 312 may be a mentor or tutor to student 311, and thus edge 315 is directed from 312 to 311. However, there may also be another relationship between these two students, for example, student 311 is the captain of the football team, and student 312 is one of the players, thus edge 314 describes that relationship and is thus directed from student 311 to student 312. Further, the edges may have additional data associated with them, such as edge type (student-to-student, or student-to-organization), or the nature of the relationship (knows well; has met) and the date the relationship began.

Node 313 is square rather than round to indicate it is a different type or class of node. In this case, node 313 represents a student organization, and students 311 and 312 are members of the organization. Thus, edges 316 and 317 connect student 312 to the organization node 313, and edges 318 and 319 connect student 311 to the organization node 313. Edges 316 and 318 are directional from the student organization to the student and represent links to membership of the organization. Edges 317 and 319 are directional from the student to the organization, and represent the student's membership, and may include data such as the date the student joined the organization, a membership number, etc.

From the foregoing, it should also be evident that how one creates the graph structure is important. In the most typical graphical scenario, one considers a large set of objects, and looks to evaluate some connection or relationship between the objects. The connection could be anything capable of definition; for example, a relationship connection for people in a social graph; a migratory path connection for protected animals in an environmental impact graph; a modus operandi connection for graphing crimes; etc. The connection is used to define the edge relations for the graph. By creating a graph model in such a way that the nodes represent the objects of interest, and the edges represent the connection of interest, the graph may be evaluated by traversing the nodes and edges. Thus, perhaps the most common and useful operation for analyzing graph structures is to find a path from one object to another object, by traversing edges and nodes.

In one embodiment, rather than store and operate with graphs strictly in terms of "nodes" and "edges" as is conventional, the methods described herein store each node as a key in a key/value store, and one or more sets of "neighbor nodes" are stored as the value corresponding to the key/node. Neighbor nodes are defined as nodes that are connected to the key/node along a path of one or more edges. The key/value store is preferably implemented using a distributed memory system, such as memcached storage. This allows for fast and efficient data operations to be performed on these sets using the set operations described in co-pending applications identified above.

Figure 4:
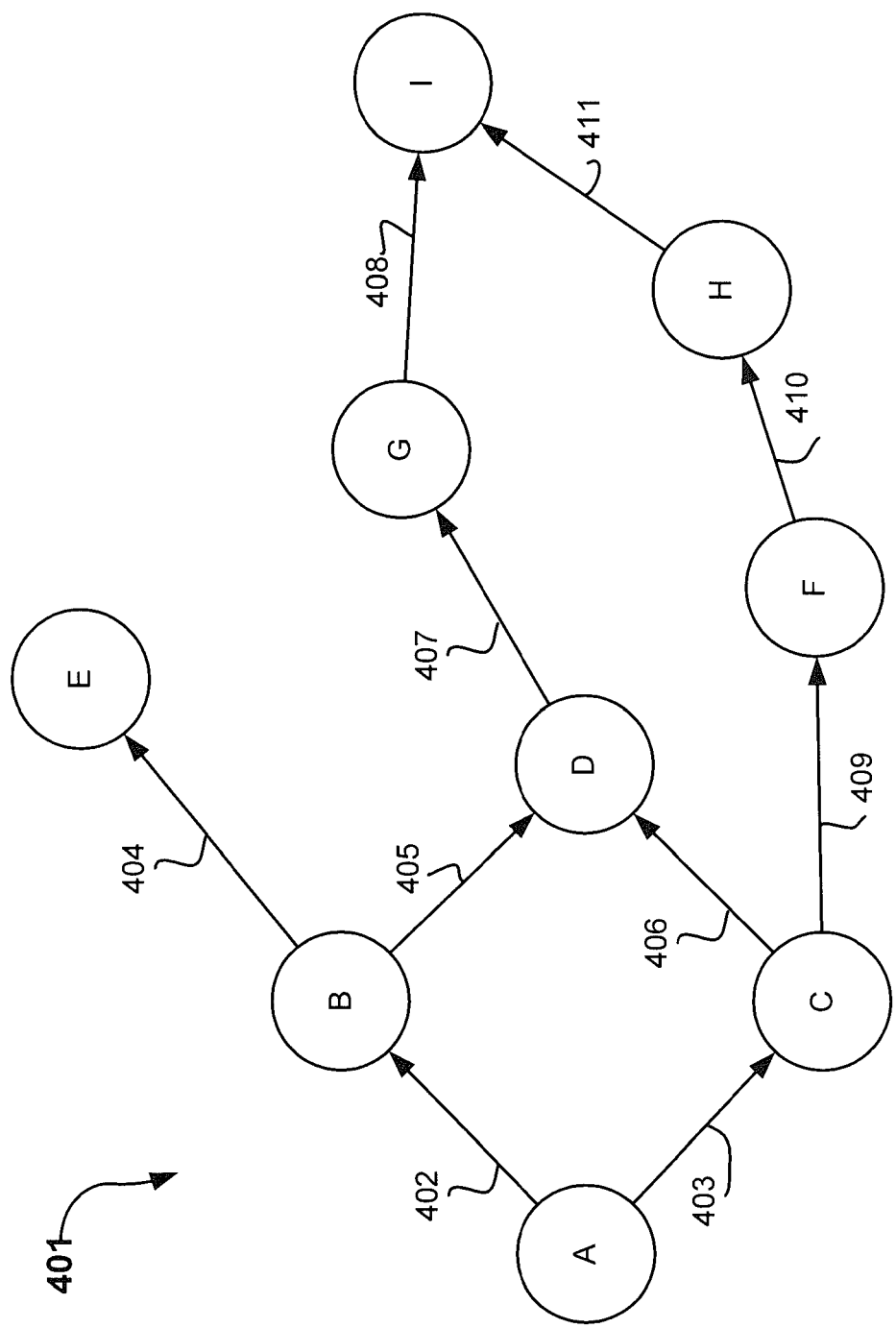
FIG. 4 is a block diagram illustrating a portion of an undirected graph structure.

FIG. 4 illustrates a graph 401 having nodes labeled A through I and edges labeled 402 through 411 connecting various pairs of the nodes. In this example, graph 401 represents a portion of a social graph wherein the nodes represent contacts, and the edges represent relationships between the contacts. Note in this example that each of the edges is directed in the manner indicated by the arrow end of the edge, although such a feature is graph and fact dependent. Thus, from graph 401, person A likes person B and they are connected through a directed relationship shown by edge 402; person A likes person C and they are connected through a directed relationship edge 403; and person B likes persons D and E through directed edges 405 and 404, respectively. Note that person B cannot traverse backwards along path edge 402 to person A; that path would normally be prohibited to person B.

It is evident from looking at graph 401 of FIG. 4 that the immediate neighbors of node A are nodes B and C, and that we can get from A to B in one hop along directed edge 402. Likewise, edge 403 is directed from node A to node C, so we can get from A to C in one hop along edge 403. We define the "out-neighbors" as those nodes that can be reached in one forward hop along a directional path, and nodes B and C are thus considered out-neighbors of node A. However, a typical query from person A is: "which of my friends knows person D?" We can see from FIG. 4 that node D is connected by one hop backwards (i.e. against the direction of edges 405, 406) to nodes B and C, which we know from above are also the out-neighbors of node A. We thus define the "in-neighbors" as those nodes that can be reached in one backward hop, and nodes B and C are thus considered in-neighbors of node D. A quick intersection of the out-neighbors of node A with the in-neighbors of node D yields the result which is apparent from FIG. 4, i.e., that nodes B and C define that intersection set; that is, friends B and C both know persons A and D, and according to our simple information, either one would be a good path for an introduction from A to D. If there were other information that made the path through either B or C easier or preferable, then such information could be taken into account in weighting the different paths, preferably to filter the results before passing to the user.

5. Determining Short Paths

A simple method 500 to determine viable short paths for person A to be introduced to person D is illustrated in FIG. 5. The process begins when a user, such as person A, enters a query into a search interface for the database, such as "which of my friends knows person D?" This query is received by the database in step 501. The database processes the query in step 502 to identify relevant information for determining a short path from A to D. Since the source of the query is person A the origin or starting node in this case identified as node A, and the destination or ending node is clearly identified in the query as person D=node D. A distance counter d is initialized and set equal to zero in step 503.

In step 504, the first sets of values to be operated on are retrieved and loaded into temporary storage in the distributed memory. In this first pass, the set of values stored for neighbor nodes located at distance d+1 from the origin node A, namely $N_1(A)$, is retrieved and stored in temporary buffer A. Also, the set of values stored for neighbor nodes at distance d from the destination node D, namely $N_0(D)$, is retrieved and stored in temporary buffer B. Initially, the neighbor sets having a direct connection to the origin $N_1(A)$ and the destination node itself $N_0(B)$ are indicated in the first iteration. These sets of values are already stored in distributed memory as the values associated with immediate neighbors of key/node A and the values associated with key/node D, and are quickly retrieved for temporary processing.

In step 505, an intersection operation is performed on the sets of values stored in temporary buffers A and B. In step 506, if the result of the intersection operation is not a null set, then the result set is stored in step 507. The result set identifies midpoint nodes of multiple paths that connect the origin node and the destination node.

In step 508, the paths back to the origin and the destination are reconstructed from the midpoints. This step is described in more detail below. In step 509, the results are filtered or sorted if necessary, then delivered to the user in step 510.

If the result of the intersection operation in step 506 is the null set, then the distance counter d is incremented in step 511. In step 512, the distance counter d is compared to a preset maximum value, such as 5. If the distance counter d is larger than the maximum value, then any possible path from node A to node D is becoming quite long, that is, through too many intermediaries, and therefore may not even be a viable path. Therefore, the process delivers a message to the user in step 513 that the search returned no results, then ends.

If the distance counter d does not exceed the maximum value in step 512, then in step 514, the first sets of neighbor nodes $N_j(D)$ for the destination are obtained, i.e., those nodes at a distance of d=1 from the destination. These first sets of neighbor nodes for the destination are also typically stored in distributed memory, thus they can be quickly retrieved and placed into temporary buffer D for another intersection operation. However, if the sets of neighbor nodes are not already stored in distributed memory, then they must be calculated. This calculation is described below with reference to FIG. 6.

When the next sets of neighbor nodes for the destination $N_1(B)$ have been placed in temporary buffer D, an intersection operation is performed again in step 515 between temporary buffers A and D. The question of whether a null set results from the operation is considered in step 516. If not, then the process jumps to step 507 to store the results. If so, then the next set of neighbor nodes for the origin node $N_2(A)$ are obtained (from storage, or calculated) and stored in buffer A in step 517, and an intersection operation is again performed in step 518. The null set question is again considered in step 519, and if there is a result from the intersection operation, the process jumps to step 507 to store the results. If a null set results, then the process returns to step 511 to increment the distance counter d and try again. The process continues for additional iterations, retrieving and using sets of neighbor nodes located further away from the nodes of interest, until either a result is obtained or the distance counter d reaches its maximum preset value.

One embodiment for calculating next sets of neighbor nodes, for example, when needed in step 514 or 517, is process 550 shown in FIG. 6. In step 551, each neighbor node in the prior sets of neighbor nodes for the node of interest is identified and is already stored in distributed memory. In step 552, the neighbor nodes located at distance d=1 from each neighbor node in the prior sets are retrieved from distributed memory. In step 553, a union operation is performed to add together all the new neighbor nodes identified in step 552. The intermediate result set in step 554 thus includes sets of neighbor nodes for each neighbor node in the prior iteration, including possible duplicate entries. In step 555, any duplicate entries are removed using a set subtraction operation. Specifically, the prior sets are subtracted from the result set obtained in step 554. The result set in step 556 now contains the next set of neighbor nodes for one of the origin or destination nodes, and these results are stored in the appropriate buffer in step 514 or 517. A recursive formulation for computing $N_d(v)$, that is, a set of neighbor nodes for node v, is shown in Equation 0 below:

$$N_{d+1}(v) = \cup_{w \in N_d(v)} N_1(w) - N_d(v) - N_{d-1}(v), \ d \geq 1 \quad (0)$$

In sum, the method described essentially traverses the graph outward from both the origin and destination, looking at successive pairs of neighbor sets until an intersection of those sets yields a result set indicating nodes in common. When a result set is obtained, the nodes in the result set are considered midpoint nodes on multiple paths that connect the origin and destination. Each of the paths is then reconstructed, from the origin node to the midpoint node, and from the midpoint node to the destination node, and the results, namely a list of viable paths from origin to destination, are delivered to the user—all substantially in real time.

In general, the set N of neighbors of a generalized node n can be written as:

$$N(n) = m | \{n,m\} \in E.$$

That is, the set N of neighbors of n is the set of all nodes m for which {n,m} is an element of the set of edges E. The graph is then stored in distributed memory as n→N(n); that is, the node n is stored as the key and the set of neighbors N(n) is stored as the value corresponding to the key using a two-level tree structure in distributed memory as described in co-pending U.S. patent application Ser. Nos. 13/104,193 and 13/104,226. As a result, advantageously, all of the edges containing node n are readily available in distributed memory.

From the discussion above, we saw that the set of immediate neighbors $N_1(n)$ was the set of nodes at a distance of 1 to n. More generally, $N_d(n)$ is the set of nodes at distance d to n. Computation of $N_d(n)$ was discussed previously. In FIG. 4, the set of neighbors at a distance of 1 to node A are nodes B and C, and this relationship can be written as $N_1(A)=\{B,C\}$; the set of neighbors at a distance of 2 to node A are nodes D, E and F, and this relationship can be written as $N_2(A)=\{D, E, F\}$; and so on. Because of the directionality of the edges in the example of FIG. 4, the set of in-neighbors of node D, that is, nodes B and C, are located against the direction of edges 405 and 406, and the direction is backward, so the distance d=−1, and this relationship can be written as $N_{-1}(D)=\{B,C\}$.

Upon initialization of the graph database, only the set of immediate neighbors are stored with a node. However, depending on need and available capacity, more distant neighbor sets may also be stored with a node, either on a temporary or permanent basis. For example, it may be possible that neighbor sets that are 2 or 3 hops away may become useful because of the popularity of a particular node, and thus keeping these sets in ready storage will facilitate faster and more economical processing of the large number of queries involving the popular nodes by avoiding having to recalculate the same sets over and over.

A path is defined as a sequence of edges linking two nodes. The length of a path is the number of edges in it. Two nodes are said to be connected if there is a path connecting them. The distance between two connected nodes is the length of the shortest path connecting them. However, a short path, and not the shortest path, may be adequate and/or desirable as a solution for a variety of reasons. Thus, the task at hand for the database is to find multiple short paths, if there are any, between two given nodes. The methods described herein leverage the graph in distributed memory, and can also leverage efficient implementations of various set operations in distributed memory, as described for example in co-pending applications identified above.

While the model is based on a general distributed graph, a social graph is an interesting application of the model where the following is true: (i) the graph is quite large (millions of nodes); (ii) a single node (the user) is seeking to connect with one other node or a small set of other nodes; and (iii) the utility or viability of a path dissipates with distance—a friend of a friend of a friend of a friend is still a stranger. Therefore, in realistic terms, only a small part of the whole graph should need to be traversed for any one query.

Consider the case of two connected nodes (a, b) and let m denote a positive integer. A useful matrix $I_m(a, b)$ is defined in Equation (1) below:

$$I_m(a,b) = N_{\lceil m/2 \rceil}(a) \cap N_{\lfloor m/2 \rfloor}(b) \text{ for } m \geq 1 \qquad (1)$$

It is noted that $I_1(a,b)=\emptyset$ is a special case for m=1. Since $N_0(v)$ is the set of nodes at distance of 0 from node v, namely {v} itself, then as a consequence, the result of the intersection operation $N_0(a) \cap N_0(b)$ is the empty set because a and b are different nodes. Initially, consider only the shortest paths. For example, let the function S(m,n,d) in Equation 2 denotes all shortest paths between two connected nodes (m,n) at a distance d>1:

Equation 2 first finds the product of ordered sets representing neighbors at different distances from the nodes of interest, then identifies paths to those sets, one side of the arguments delivering paths from m→w and the other side delivering paths from w→n. S(m,n,d) in Equation 2 denotes all shortest paths between two connected nodes (m,n) at a distance d>1:

$$S(m, n, d) = U_{w \in I_d(m,n)} S\left(m, w, \left\lceil \frac{d}{2} \right\rceil\right) \times S\left(w, n, \left\lfloor \frac{d}{2} \right\rfloor\right) \qquad (2)$$

Note that to compute shortest paths between two nodes m and n, the distance between them must be computed. This is simply the smallest d for which the matrix $I_d(m,n)$ is not empty. Further, although Equation 2 is a recursive function, it can just as easily be performed iteratively starting from shorter to longer paths. This would allow a server to return shorter paths while still in the process of generating longer ones. By storing intermediary results in distributed memory, it is not necessary for the request for additional results to be performed by the same server as the initial request.

Once this distance d is known, the matrix $I_d(m,n)$ is computed. Next, for every node w in the matrix, the following are recursively computed: (i) the shortest paths from m to w; and (ii) the shortest paths from w to n. Next, every path computed in step (ii) is appended to every path computed in step in step (i). The result is a list of all the shortest paths from m to n. The intermediate results are stored in distributed memory so that they can be used in other shortest path computations.

Ideally, for a certain maximum distance k, which is usually no larger than 5 for modeling social networks, the entire $I_k(a,b)$ matrix of neighbors, i.e., over all pairs of nodes a,b is stored in distributed memory. If so, then queries of the form S (m, n, k') for any k'≤k can be performed exceptionally fast. Set operations as in Equation 1 are then not needed; just an iterative enumeration of the paths as defined by Equation 2.

The methods described provide ample opportunity for parallelization in an actual implementation. The expansion of the neighbor sets, the calculation of the intersections, and the recursive calls each allows for concurrency. This concurrency may be exploited locally in a particular server and globally among a set of servers attached to distributed memory, thus making the system horizontally scalable, by having multiple levels of cache, both in distributed memory and in a local cache from which data is aged out.

In order to effectively use distributed memory, a naming scheme is needed for intermediate results. The basic graph is composed of three kinds of sets representing edge sets in the graph:

"id(n)" represents the identity edge on n and is composed of n's $N_0$ neighbor—itself;

"id(n)|edgeType" contains all the $N_1$ neighbors of n along edges of type edgeType;

"id(n)|edgeType[d]" contains all the $N_d$ neighbors of n along edges of type edgeType; and "edgeType|id(n)" contains all the nodes for whom n is a $N_1$ neighbor along edges of type edge Type.

The intersection sets and the paths also need to be specified:

"midpoint:n$m|edgeType[d]" identifies the intersection nodes at distance d; and

"paths:n$m|edgeType[d]" identifies the paths.

The methods described above efficiently find all shortest paths. However, as was also noted above, in some applications only a short path need be found, not necessarily the shortest path.

Acyclic paths of length d+1 are computed as follows. To describe it we need some additional notation. Let S(m,n) and $S^{+1}$(m,n) denote the sets of paths from m to n of lengths d and d+1 respectively. There are two cases.

case 1:

$$\cup_{w \in I_{d+1}(m,n)} S(m,w) \times S(w,n)$$

case 2:

$$\cup_{w \in I_d(m,n)} S^{+1}(m,w) \times S(w,n) \cup S(m,w) \times S^{+1}(w,n)$$

From Lemma 2 above, by removing from the result set the paths found by Equation (3) in which the neighbors of w are identical, all paths with cycles in them are eliminated. We concentrate on these cases base use case. If m is not directly linked to n, then a path of length d+2 already has at least 3 intermediate nodes and likely contains all the paths of interest.

For paths of length greater than d+2, checking for cycles becomes more onerous and devolves to checking each pair of path segments as they are placed together.

For directed graphs, Equation (1) can be modified as follows:

$$I_m(a,b) = O_{[m/2]}(a) \cap I_{[m/2]}(b) \text{ for } m > 1 \quad (1A)$$

$O_{[m/2]}(a)$ is the set of nodes reachable from a via a directed path of length [m/2] and not by a shorter path. $I_{[m/2]}(b)$ is the set of nodes v where b is reachable from v via a directed path of length [m/2] and not by a shorter path. Equation (2) is unchanged, but Equation (0) becomes:

$$O_{d+1}(v) = \cup_{w \in O_d(v)} O_1(w) - O_d(v) - O_{d-1}(v), d \geq 1$$

$$I_{d+1}(v) = \cup_{w \in I_d(v)} I_1(w) - I_d(v) - I_{d-1}(v), d \geq 1$$

6. Weighted Graphs

For weighted graphs, or more generally, where there is some data structure attached to the edges and/or the nodes, the values are preferably kept in a separate data structure that shadows the graph structure. Thus, for every neighbor set s there is a value set w:s containing the values and a function w:s(m) to retrieve the value of m. Values for node n are in w:id(n) and values for its neighbors are in w:id(n)/edgeType. The value may be record or just a single value. Regardless, the value is simply referred to as the "weight."

To use these values as part of a method to determine short paths, such as those described above, a composition function "*" is defined, over weights, so that if path a→b has weight i and path b→c has weight j, then path a→b→c has weight i*j.

Note that path a→d→c may have a different weight, so that determining a specific weight for path a→c would require applying a function over the sets, like min or max, but the function could be used to sort the order in which results are extended, rather than to adjust the methods described To keep things simple, we can assume that the composition function * is associative. Then, a weight is assigned to each path as follows:

1) for paths (n,m,1), which in fact consists of the single path [m] if there is an edge from n to m, the weight is: id(n) |edgeType(m);

2) since the composition function * is associative, if path a has weight a_w and path b has weight b_w, then the concatenation of a and b has weight a_w*b_w.

As it turns out, the problem of finding acyclic weighted paths may be efficiently solved by a variant of the previous methods. The previous methods specifically enumerate acyclic paths in order of non-decreasing path length. Here, however, we need to enumerate paths in order of non-decreasing weight rather than length. That these two problems are indeed different may be noted by observing the following: in edge-weighted graphs, lighter paths can in fact contain more edges than heavier ones.

The variant method uses a different definition of a neighborhood of a node. In the previous method, the neighbor set $N_d(n)$ was defined as the set of nodes at distance d from node n. In the variant method, a new neighbor set $N_l(n)$ is used to denote the set of nodes having a path of length 1 to n. The variant method uses the following variant of Equation (2).

If node $b \in N_l(a)$, then the weight of the composite edge from node a to node b is $N_l(a,b)$ defined as:

$$+_{\{v \in N_{n-1}(a) | (b \in N_1(v))\}} N_{n-1}(a,v) * N_1(v,b).$$

The weight of a node c in the set $I_m(a, b)$ is defined as:

$$I_m(a,b)(c) = N_{\lceil \frac{m}{2} \rceil}(a,c) * N_{\lfloor \frac{m}{2} \rfloor}(b,c).$$

This expression returns a weight for each node for every length path, which can be used to return paths in a weighted order. All that remains is to define the functions + and * in a manner appropriate to the application. In a simple weighted graph, * is defined as addition and + as minimum.

7. Detailed System Overview

Figure 2A:
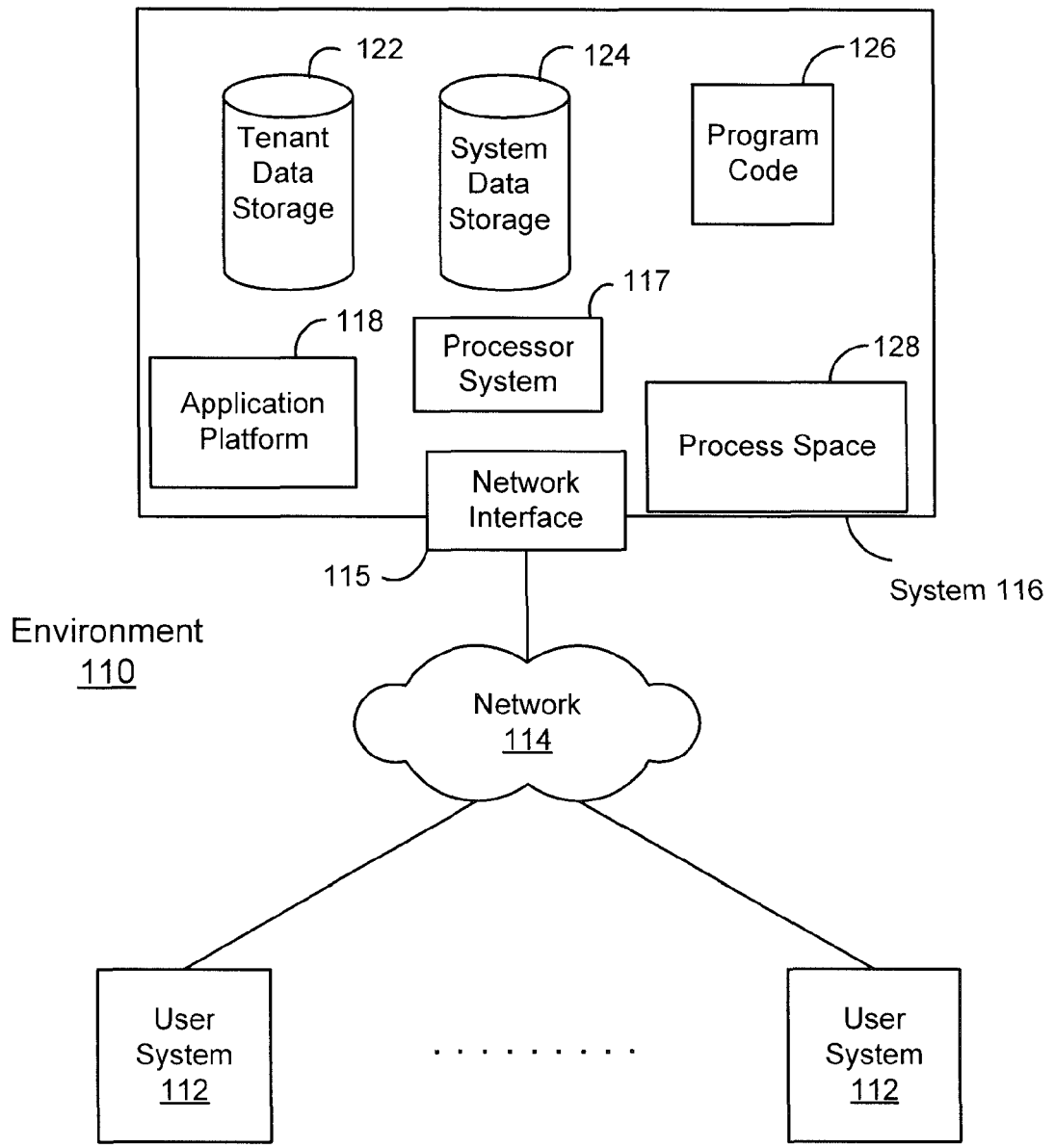
FIG. 2A is a block diagram illustrating an example of an environment wherein an on-demand database service might be used.

FIG. 2A is a block diagram of an exemplary environment 110 for use of an on-demand database service. Environment 110 may include user systems 112, network 114 and system 116. Further, the system 116 can include processor system 117, application platform 118, network interface 120, tenant data storage 122, system data storage 124, program code 126 and process space 128. In other embodiments, environment 110 may not have all of the components listed and/or may have other elements instead of, or in addition to, those listed above.

User system 112 may be any machine or system used to access a database user system. For example, any of the user systems 112 could be a handheld computing device, a mobile phone, a laptop computer, a work station, and/or a network of computing devices. As illustrated in FIG. 2A (and in more detail in FIG. 2B), user systems 112 might interact via a network 114 with an on-demand database service, which in this embodiment is system 116.

An on-demand database service, such as system 116, is a database system that is made available to outside users that are not necessarily concerned with building and/or maintaining the database system, but instead, only that the database system be available for their use when needed (e.g., on the demand of the users). Some on-demand database services may store information from one or more tenants into tables of a common database image to form a multi-tenant database system (MTS). Accordingly, the terms "on-demand database service 116" and "system 116" will be used interchangeably in this disclosure. A database image may include one or more database objects or entities. A database management system (DBMS) or the equivalent may execute storage and retrieval of information against the database objects or entities, whether the database is relational or graph-oriented. Application platform 118 may be a framework that allows the applications of system 116 to run, such as the hardware and/or software, e.g., the operating system. In an embodiment, on-demand database service 116 may include an application platform 118 that enables creation, managing and executing one or more applications developed by the provider of the on-demand database service, users accessing the on-demand database service via user systems 112, or third party application developers accessing the on-demand database service via user systems 112.

The users of user systems 112 may differ in their respective capacities, and the capacity of a particular user system 112 might be entirely determined by permission levels for the current user. For example, where a salesperson is using a particular user system 112 to interact with system 116, that user system has the capacities allotted to that salesperson. However, while an administrator is using that user system to interact with system 116, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 114 is any network or combination of networks of devices that communicate with one another. For example, network 114 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global network of networks often referred to as the Internet, that network will be used in many of the examples herein. However, it should be understood that the networks that the one or more implementations might use are not so limited, although TCP/IP is a frequently implemented protocol.

User systems 112 might communicate with system 116 using TCP/IP and, at a higher network level, use other common Internet protocols to communicate, such as HTTP, FTP, AFS, WAP, etc. In an example where HTTP is used, user system 112 might include an HTTP client commonly referred to as a browser for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least as for the users that are accessing that server, each of the plurality of servers has access to the data stored in the MTS; however, other alternative configurations may be used instead.

In one embodiment, system 116 implements a web-based customer relationship management (CRM) system. For example, in one embodiment, system 116 includes application servers configured to implement and execute CRM software applications as well as provide related data, code, forms, web pages and other information to and from user systems 112 and to store to, and retrieve from, a database system related data, objects, and Web page content. With a multi-tenant system, data for multiple tenants may be stored in the same physical database object; however, tenant data typically is arranged so that data of one tenant is kept logically separate from that of other tenants so that one tenant does not have access to another tenant's data, unless such data is expressly shared. In certain embodiments, system 116 implements applications other than, or in addition to, a CRM application.

For example, system 116 may provide tenant access to multiple hosted (standard and custom) applications, including a CRM application. User (or third party developer) applications, which may or may not include CRM, may be supported by the application platform 118, which manages creation, storage of the applications into one or more database objects and executing of the applications in a virtual machine in the process space of the system 116.

One arrangement for elements of system 116 is shown in FIG. 5, including a network interface 120, application platform 118, tenant data storage 122 for tenant data 123, system data storage 124 for system data 125 accessible to system 116 and possibly multiple tenants, program code 126 for implementing various functions of system 116, and a process space 128 for executing MTS system processes and tenant-specific processes, such as running applications as part of an application hosting service. Additional processes that may execute on system 116 include database indexing processes.

Several elements in the system shown in FIG. 2A include conventional, well-known elements that are explained only briefly here. For example, each user system 112 could include a desktop personal computer, workstation, laptop, PDA, cell phone, or any wireless access protocol (WAP) enabled device or any other computing device capable of interfacing directly or indirectly to the Internet or other network connection. User system 112 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 112 to access, process and view information, pages and applications available to it from system 116 over network 114. Each user system 112 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 112 and all of its components are operator configurable using applications, such as a browser, including computer code run using a central processing unit such as an Intel Pentium® processor or the like. Similarly, system 116 (and additional instances of an MTS, where more than one is present) and all of their components might be operator configurable using application (s) including computer code to run using a central processing unit such as processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 116 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 116 is configured to provide web pages, forms, applications, data and media content to user (client) systems 112 to support the access by user systems 112 as tenants of system 116. As such, system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2B:
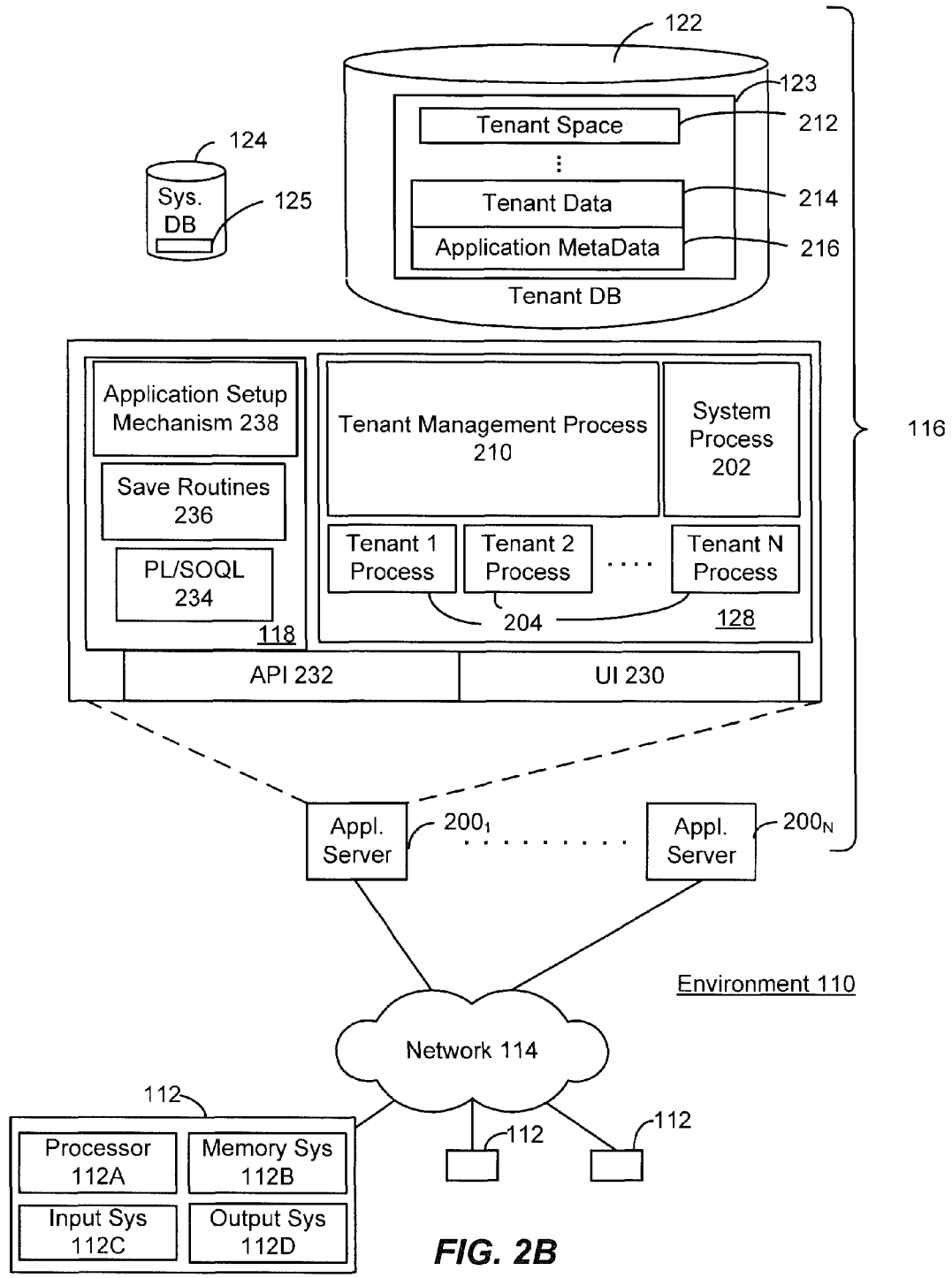
FIG. 2B is a block diagram illustrating an embodiment of elements of FIG. 5 and various possible interconnections between those elements.

FIG. 2B also illustrates environment 110. However, in FIG. 2B elements of system 116 and various interconnections in an embodiment are further illustrated. FIG. 2B shows that user system 112 may include processor system 112A, memory system 112B, input system 112C, and output system 112D. FIG. 2B shows network 114 and system 116. FIG. 2B also shows that system 116 may include tenant data storage 122, tenant data 123, system data storage 124, system data 125, User Interface (UI) 230, Application Program Interface (API) 232, PL/SOQL 234, save routines 236, application setup mechanism 238, applications servers $200_1$-$200_N$, system process space 202, tenant process spaces 204, tenant management process space 210, tenant storage area 212, user storage 214, and application metadata 216. In other embodiments, environment 110 may not have the same elements as those listed above and/or may have other elements instead of, or in addition to, those listed above.

User system 112, network 114, system 116, tenant data storage 122, and system data storage 124 were discussed above in FIG. 2A. Regarding user system 112, processor system 112A may be any combination of one or more processors. Memory system 112B may be any combination of one or more memory devices, short term, and/or long term memory. Input system 112C may be any combination of input devices, such as one or more keyboards, mice, trackballs, scanners, cameras, and/or interfaces to networks. Output system 112D may be any combination of output devices, such as one or more monitors, printers, and/or interfaces to networks.

As shown by FIG. 2B, system 116 may include a network interface 115 (of FIG. 2A) implemented as a set of HTTP application servers 200, an application platform 118, tenant data storage 122, and system data storage 124. Also shown is system process space 202, including individual tenant process spaces 204 and a tenant management process space 210. Each application server 200 may be configured to tenant data storage 122 and the tenant data 123 therein, and system data storage 124 and the system data 125 therein to serve requests of user systems 112. The tenant data 123 might be divided into individual tenant storage areas 212, which can be either a physical arrangement and/or a logical arrangement of data. Within each tenant storage area 212, user storage 214 and application metadata 216 might be similarly allocated for each user. For example, a copy of a user's most recently used (MRU) items might be stored to user storage 214. Similarly, a copy of MRU items for an entire organization that is a tenant might be stored to tenant storage area 212. A UI 230 provides a user interface and an API 232 provides an application programmer interface to system 116 resident processes to users and/or developers at user systems 112. The tenant data and the system data may be stored in various databases, such as one or more Oracle™ databases, or in distributed memory as described herein.

Application platform 118 includes an application setup mechanism 238 that supports application developers' creation and management of applications, which may be saved as metadata into tenant data storage 122 by save routines 236 for execution by subscribers as one or more tenant process spaces 204 managed by tenant management process 210 for example. Invocations to such applications may be coded using PL/SOQL 234 that provides a programming language style interface extension to API 232. A detailed description of some PL/SOQL language embodiments is discussed in commonly owned, co-pending U.S. Provisional Patent App. No. 60/828,192, entitled Programming Language Method And System For Extending APIs To Execute In Conjunction With Database APIs, filed Oct. 4, 2006, which is incorporated in its entirety herein for all purposes. Invocations to applications may be detected by one or more system processes, which manages retrieving application metadata 216 for the subscriber making the invocation and executing the metadata as an application in a virtual machine.

Each application server 200 may be coupled for communications with database systems, e.g., having access to system data 125 and tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. Transfer Control Protocol and Internet Protocol (TCP/IP) are typical protocols for communicating between application servers 200 and the database system. However, it will be apparent to one skilled in the art that other transport protocols may be used to optimize the system depending on the network interconnect used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, an interface system implementing a load balancing function (e.g., an F5 Big-IP load balancer) is coupled for communication between the application servers 200 and the user systems 112 to distribute requests to the application servers 200. In one embodiment, the load balancer uses a "least connections" algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, system 116 is multi-tenant and handles storage of, and access to, different objects, data and applications across disparate users and organizations.

As an example of storage, one tenant might be a company that employs a sales force where each salesperson uses system 116 to manage their sales process. Thus, a user might maintain contact data, leads data, customer follow-up data, performance data, goals and progress data, etc., all applicable to that user's personal sales process (e.g., in tenant data storage 122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be shared organization-wide or accessible by a plurality of users or all of the users for a given organization that is a tenant. Thus, there might be some data structures managed by system 116 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 116 might also maintain system level data usable by multiple tenants or other data. Such system level data might include industry reports, news, postings, and the like that are sharable among tenants.

In certain embodiments, user systems 112 (which may be client systems) communicate with application servers 200 to request and update system-level and tenant-level data from system 116 that may require sending one or more queries to tenant data storage 122 and/or system data storage 124. System 116 (e.g., an application server 200 in system 116) automatically generates one or more SQL statements (e.g., one or more SQL queries) that are designed to access the desired information. System data storage 124 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. U.S. Pat. No. 7,779,039, entitled Custom Entities and Fields in a Multi-Tenant Database System, is hereby incorporated herein by reference, and teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for operating a database, comprising:
providing a distributed memory apparatus;
storing at least one graph in the distributed memory apparatus using a key/value schema, the graph being organized as a set of nodes and a set of edges, each node representing an object, each edge connecting a pair of nodes and describing a relationship between the pair of nodes, the key/value schema comprising storing each node as a key, and for each key, storing a corresponding value comprising at least one set of neighbor nodes, a neighbor node defined as being connected to the key node by a path having at least one edge;
performing a query over the stored graph using set operations in the distributed memory apparatus; and
delivering a result of the query to a user.

2. The method of claim 1, wherein the nodes and/or edges have properties associated therewith, and one or more of the properties may be used to filter or weight the results.

3. The method of claim 1, wherein performing a first query regarding two objects of interest comprises:

retrieving the nodes and corresponding neighbor nodes for the objects of interest into a temporary store; and
performing one or more set operations using the retrieved nodes and corresponding neighbor nodes in accord with the first query to generate the result.

4. The method of claim 3, further comprising:
storing the result of the first query in the distributed memory apparatus for use in similar queries involving the objects of interest.

5. The method of claim 3, wherein the first query includes finding a short path between the objects of interest, the first object of interest represented as a first node, and the second object of interest represented as a second node, comprising:
performing an intersection operation between sets of neighbor nodes, one set corresponding to the first node and another set corresponding to the second node, wherein if the intersection operation results in an intersection set, then one or more neighbor nodes in the intersection set represent one or more midpoint nodes corresponding to one or more paths, each path connecting the first node and a respective midpoint node, and the respective midpoint node and the second node.

6. The method of claim 5, wherein each of the sets of neighbor nodes comprises a first set of nodes directly connected to the corresponding key node along a path having a single edge.

7. The method of claim 5, wherein if the intersection operation does not result in an intersection set, then a new set of neighbor nodes corresponding to the second node is obtained, and the step of performing an intersection operation is performed again with the new set of neighbor nodes replacing the prior set of neighbor nodes corresponding to the second node.

8. The method of claim 7, further comprising a method for obtaining the new sets of neighbor nodes, comprising, for each node in the prior set of neighbor nodes, retrieving a set of neighbor nodes stored in the distributed memory, the combination of the retrieved sets comprising the new sets.

9. The method of claim 7, further comprising a method for obtaining the new sets of neighbor nodes, comprising:
for each node in the prior set of neighbor nodes, retrieving a set of neighbor nodes stored in the distributed memory;
performing a union operation on the retrieved sets of neighbor nodes, the union set comprising an intermediate result; and
performing a difference operation on the intermediate results and the prior sets of neighbor nodes, the difference set comprising the new set of neighbor nodes.

10. The method of claim 5, wherein if the intersection operation does not result in an intersection set when the step of identifying a viable path is performed again, then a new set of neighbor nodes corresponding to the first node is obtained, and the step of performing an intersection operation is performed again with the new set of neighbor nodes replacing the prior set of neighbor nodes corresponding to the first node.

11. The method of claim 5, wherein if the intersection operation does not result in an intersection set, then the method further comprises the sequential steps of:
a. retrieving a new set of neighbor nodes for the second node;
b. performing the intersection operation again;
c. if the intersection operation results in a null set, retrieving a new set of neighbor nodes for the first node;
d. performing the intersection operation again; and
e. repeating steps a through d until the intersection operation does not result in a null set or a predefined maximum is reached.

12. The method of claim 1, wherein a first query includes finding a short path between a first object of interest represented as a first node and a second object of interest represented as a second node, comprising:
traversing the graph in stages from the first node in one direction and from the second node in another direction;
at each stage, examining sets of neighbor nodes, one set corresponding to the first node and another set corresponding to the second node, wherein at each stage after the first stage, a new set of neighbor nodes is obtained in alternating stages for the first and second nodes to replace the prior set, each new set being one step further away from the first or second node, respectively, than the prior set; and
upon finding common nodes in the examining step, the common nodes representing midpoint nodes in one or more paths connecting the first node to the second node, reconstructing the one or more paths.

13. The method of claim 12, wherein the examining step comprises:
performing an intersection operation between sets of neighbor nodes, one set corresponding to the first node and another set corresponding to the second node, wherein if the intersection operation results in an intersection set, then the one or more neighbor nodes in the intersection set represent one or more midpoint nodes corresponding to one or more paths, each path connecting the first node and a respective midpoint node, and the respective midpoint node and the second node.

14. The method of claim 13, wherein (i) if the intersection operation results in a null set, then a next set of neighbor nodes is obtained for the second node and the intersection operation is performed again, and wherein (ii) if the intersection operation still results in a null set, then a next set of neighbor nodes is obtained for the first node and the intersection operation is performed again, and wherein steps (i) and (ii) are performed alternately and repeatedly until the intersection operation does not result in a null set.

15. The method of claim 14, further comprising a method for obtaining the next sets of neighbor nodes, comprising, for each node in the prior set of neighbor nodes, retrieving a set of neighbor nodes stored in the distributed memory, the combination of the retrieved sets comprising the next sets.

16. A non-transitory machine-readable medium having one or more sequences of instructions for performing a search of a database over a network stored in the database, the network having a plurality of objects connected by a plurality of relationships, the graph of the network being modeled by a plurality of nodes representing the objects, and a plurality of edges connecting nodes, the edges representing relationships between objects, which instructions, when executed by one or more processors, cause the one or more processors to carry out the steps of:
providing access to a distributed memory apparatus;
storing the network as a graph in the distributed memory apparatus using a key/value schema, wherein according to the key/value schema, each of the plurality of nodes in the social network is stored as a key, and for each key, a corresponding value is stored comprising at least one set of neighbor nodes, a neighbor node being defined as connected to a node of interest by a path having at least one edge;
performing a query over the stored graph using set operations in the distributed memory apparatus; and
delivering a results list from the operations to a user.

17. The medium of claim 16, further having steps for finding a short path between a first node and a second node, comprising:

traversing the graph in stages, outward from the first node in one direction and outward from the second node in another direction;

at each stage, examining sets of neighbor nodes corresponding first and second nodes, wherein after the initial examining step, a new set of neighbor nodes is obtained for the first and second nodes, respectively, in alternate stages, to replace the prior set, each new set being one step further away from the first or second node, respectively; and upon finding common nodes in the examining step, the common nodes representing midpoint nodes in one or more paths connecting the first node to the second node, reconstructing the one or more paths as a results list.

18. The medium of claim 17, wherein the examining step comprises:

performing an intersection operation between sets of neighbor nodes.

19. The medium of claim 17, further having steps for obtaining the new sets, comprising, for each node in the prior set of neighbor nodes, retrieving a set of neighbor nodes stored in the distributed memory, the combination of the retrieved sets comprising the new set.

20. An apparatus for managing and evaluating a network of objects, comprising:

a database;

a database manager program having executable instruction sets for managing storage, indexing and retrieval of the data records from the database;

a distributed memory system accessible to the database and operable in accord with a first instruction set of the database manager program, the first instruction set for storing the network as an indexed graph structure in the distributed memory system using a key/value schema, the network having a plurality of objects connected by a plurality of relationships, the objects represented as nodes and the relationships represented as edges connecting nodes that have a relationship, wherein according to the key/value schema, each of the nodes is stored as a key, and for each key, a corresponding value is stored comprising at least one set of neighbor nodes for the respective key/node, each set of neighbor nodes comprises a set of nodes connected to the key/node along a path of one or more edges; and a search interface in communication with the database manager program and operable in accord with a second instruction set of the database manager program, the second instructions for performing query operations on the data records using the indexed graph structures, and for delivering results to a user.

\* \* \* \* \*